United States Patent [19]

Cantenot

[11] 4,418,088

[45] Nov. 29, 1983

[54] PROCESS FOR PREPARING A FOOD PRODUCT

[75] Inventor: Francois Cantenot, St. Usage, France

[73] Assignee: M.B.E. Minoterie Biscotterie d'Echenon, Saint Jean de Losne, France

[21] Appl. No.: 318,154

[22] Filed: Nov. 4, 1981

[30] Foreign Application Priority Data

Nov. 10, 1980 [FR] France ................................ 80 23975

[51] Int. Cl.³ ........................................... A21D 13/04
[52] U.S. Cl. .................................. 426/549; 426/618; 426/560; 426/448
[58] Field of Search ........ 426/549, 550, 560, 445–449, 426/463, 466, 559, 625, 808, 555, 615, 618

[56] References Cited

U.S. PATENT DOCUMENTS

| | | | |
|---|---|---|---|
| 2,701,200 | 2/1955 | Huber et al. | 426/466 |
| 3,539,356 | 11/1970 | Benson et al. | 426/560 |
| 3,600,193 | 8/1981 | Glabe et al. | 426/555 |
| 3,787,588 | 1/1974 | Turitz | 426/808 |

*Primary Examiner*—Raymond N. Jones
*Assistant Examiner*—Elizabeth A. Hatcher
*Attorney, Agent, or Firm*—McCormick, Paulding & Huber

[57] ABSTRACT

A process for preparing a food product comprising roasted corn flour, wheat flour, sugar and salt wherein said mixture is shaped extruded-baked and cooled immediately thereafter.

12 Claims, 1 Drawing Figure

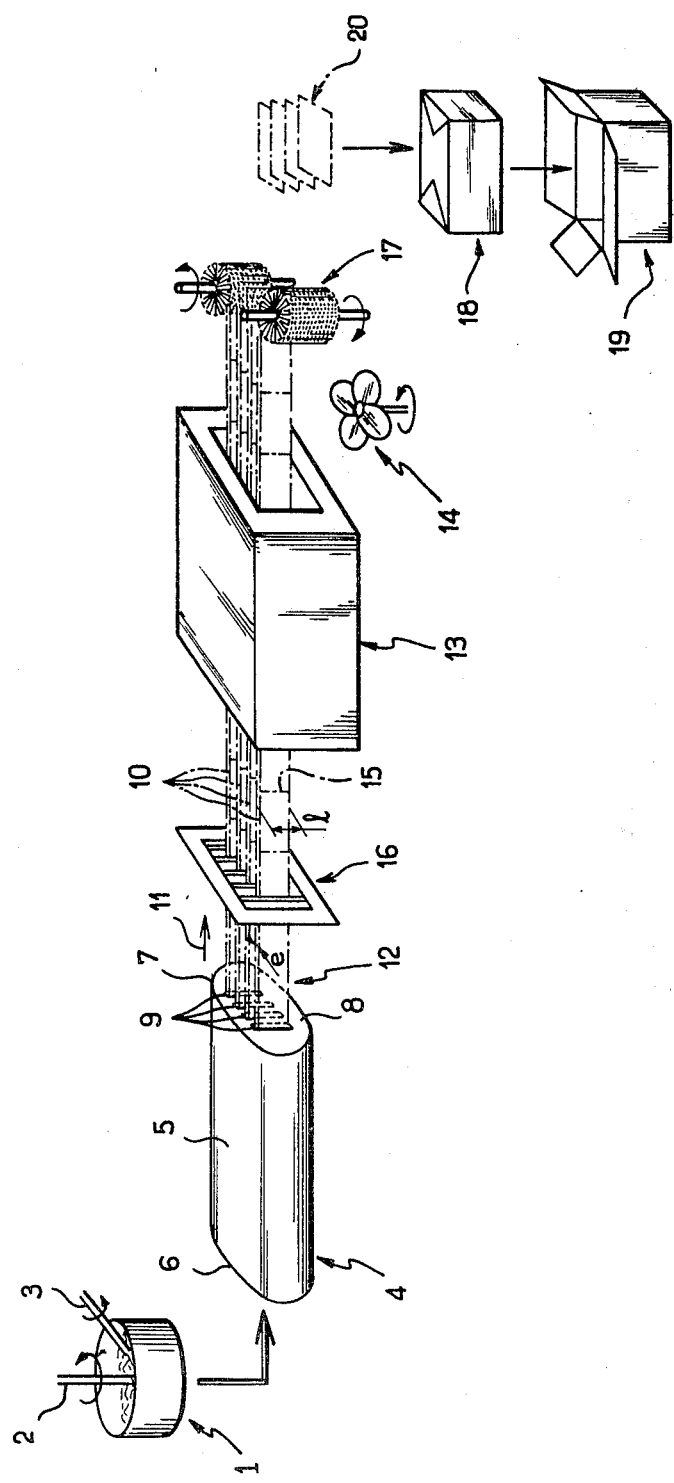

PROCESS FOR PREPARING A FOOD PRODUCT

The present invention relates to a process for manufacturing a food product, and to a food product obtained by this process.

More precisely, the present invention relates to the manufacture of products similar to rusks, of which a certain number of variations are already known.

These known variations differ essentially by the mode of baking the product and by its presentation, but they generally have the same taste since their composition varies little from one product to another.

As a general rule, these products are made by baking a mixture of wheat flour, sugar, possibly milk and fats, and salt.

These products are rather insipid and it has appeared judicious to propose products which, although related by their presentation to such products, have a much more attractive, but discrete, taste.

It has been unexpectedly discovered that such a taste can be obtained by replacing part of the wheat flour which is generally used for such products, by a flour obtained by milling roasted corn.

Tests for taste made on products obtained by replacing in this way from 10 to 60% of the wheat flour by a roast corn flour, have shown a particular taste, distinct from that of the products made from an exclusively wheat flour, and in which no taste of the roasted corn was detected; tasting of a product obtained from a flour including 30% of roast corn flour and 70% of wheat flour even revealed a completely unexpected smoky taste, obtained naturally and without exposing the product being manufactured to any conventional treatment already known for giving such a taste; the products obtained respectively from a flour containing 30%, 40%, 50% and 0% of roast corn flour received, respectively, 85%, 81%, 81% and 78% of the positive comments, a good taste having been indicated respectively in 64%, 49%, 44% and 46% of the cases and a flavour indicated respectively in 37%, 25%, 27% and 13% of the cases.

It is seen that, particularly in the case of a product made from a flour containing 30% of roast corn flour and 70% of wheat flour, the comments obtained for the product according to the invention were clearly favourable compared with a product of known type not containing any corn flour; this known product, which is nonetheless generally appreciated, was considered as tasteless by 2/5 ths of those taking part in the tests.

The process according to the invention for manufacturing a food product, is characterized in that the following substances, by units of weight, are intimately mixed:

100 units of flour at a rate of 10 to 60 units of roast corn flour and the complement composed of wheat flour;
from 1 to 5 units of sugar;
from 0 to 3.5 units of milk;
from 0 to 3.5 units of fats;
about 1 unit of salt, and the mixture is fashioned into appropriate shapes and baked.

According to a preferred embodiment of the process, the mixture is shaped and baked simultaneously and continuously by a process known under the name of extrusion-baking, preferably at a temperature higher than 100° C. in order to provoke a vaporization of water inside the product, before a rapid cooling, immediately after extrusion, which causes cells to form in the product due to condensation of the water vapourised during baking.

The product is then advantageously toasted so as to be rendered friable and to present an attractive golden colour.

Other features and advantages of the process according to the invention and of the product obtained will be seen from the following description relative to a non-limiting embodiment, with reference to the accompanying drawings which diagrammatically illustrate the steps of the process.

According to this preferred embodiment, the following substances are mixed, in units by weight and for example in kilos:

100 units of flour at a rate of 10 to 60 units of roast corn flour and the complement composed of wheat flour, and preferably at a rate of 30 to 50 units of roast corn flour with the corresponding amount of wheat flour;

from 1 to 5 units of sugar, and preferably 2.5 units of sugar;

from 0 to 3.5 units of milk, and preferably 2.5 units of milk, preferably composed of skimmed milk;

about 1 unit of salt, said mixture being homogeneous, before adding to the mixture thus obtained the fats at a rate of 0 to 3.5 units by weight, the preferred value being of the order of 2 units.

Whether the flour used is wheat flour or roast corn flour, it presents a conventional granulometry; good results were obtained with a flour of type 55, this indication being given by non-limiting example.

Mixing is carried out in a conventional mixer 1 provided with a rapidly rotating screw 2 (e.g. 300 r.p.m.) and a rotating crusher device 3 (e.g. 3000 r.p.m.) in order to mix the fat, which is preferably of vegetable origin, of the "oil" type, regularly in the other constituents; on leaving the mixer, the mixture is dry.

The mixture is then fashioned into appropriate shapes and baked, preferably by the known process of extrusion-baking; good results are obtained using a baking-extruding machine 4 manufactured by the firm "Creusot-Loire," (e.g. under the reference BC 82).

This apparatus 4, which is only a non-limiting example of a device which may be used for carrying out the process according to the invention, comprises, inside a sleeve 5 heated by inductors (not shown), two spiral conveyors (not shown) whose axes are parallel and which rotate in the same direction, the threads of these two screws fitting in each other and having a pitch decreasing until it reverses from an inlet zone 6 for the matter to be extruded in the sleeve up to an outlet zone 7 for this matter; in this outlet zone 7, the thread of the screws presents notches between which the product must pass before passing through an extrusion head 8 comprising one or more dies 9 which shape the product.

According to the invention, the temperature to which the product is taken inside the sleeve 5 of the baking-extruding machine 4 is higher than 100° C., and preferably between 140° and 155° C., in order to provoke vaporization of the water in the constituents of the mixture and to bake said mixture; by way of non-limiting example, good results were obtained in the tests with a rate of extrusion of the order of 300 kilos per hour, the extrusion head 8 comprising four dies 9 4 cm high and 2 mm thick, shaping the product in 4 strips 10 presenting these dimensions transversely with reference to a longitudinal direction 11 of extrusion (resp. 1,e); it is generally preferable to shape and bake the mixture in the form of a flat strip having a thickness of less than 10 mm.

On leaving the apparatus 4, more particularly the extrusion head 8, the product is cooled rapidly, for example by contact with the open air (at 12), this causing the formation of cells inside, since the water vapour which formed during baking and which could not escape due to the conditions of pressure prevailing in the mixture during baking inside the sleeve 5, condenses suddenly; in addition, the change in the pressure conditions on the surface of the product on leaving the sleeve 5 and coming into contact with the open air (at 12), causes the water vapour to escape to the surface, which also produces cells on the surface.

The product is then toasted in an oven 13, this giving it a pleasant colour and rendering it friable; by way of non-limiting example, good results were obtained by subjecting a product in the form of a strip 2 mm thick (e) and 4 cm wide (1) to passage lasting 14 seconds through an oven 6 m long, taken to a temperature of the order of 350° to 380° C.

On leaving the toasting oven 13, the product is cooled by fans 14.

According to a preferred embodiment of the process, particularly when the product is manufactured continuously, for example by extrusion-baking, particularly in the form of a flat strip 10, the product is prepared for the subsequent cutting up necessary for its packing after toasting, before said toasting, i.e. in the example chosen, after cooling at the exit 12 of the baking-extruding machine 4 and before entering the toasting oven 13; to this end, generally transverse, and possibly also longitudinal notches 15 are made in the thickness of the product, particularly in strip form 10, by means of knives 16; on leaving the toasting oven 13 and after having been cooled, the product is subjected to the action of brushes 17 which cause it to break along the notches 15.

The product 20 is then packed, in manner known per se, in an impermeable film 18 and placed in a cardboard container 19.

The embodiment of the process according to the invention which has just been described naturally constitutes only a nonlimiting example and numerous variants may be made without departing from the scope of the invention.

What is claimed is:

1. Process for manufacturing a food product, comprising the steps of intimately mixing the following substances in units by weight:
    100 units of flour at a rate of 10 to 60 units of roast corn flour and the complement composed of wheat flour;
    from 1 to 5 units of sugar;
    from 0 to 3.5 units of milk;
    from 0 to 3.5 units of fat;
    about 1 unit of salt,
shaping the mixture and baking it simultaneously and continuously by extrusion-baking at a temperature higher than 100° C. to provoke a vaporization of water, and cooling the extruded-baked mixture immediately after extrusion to condense the water vaporized during baking and provoke the formation of cells.

2. The process of claim 1, wherein the mixture is made by first mixing the flour, sugar, milk and salt, and there after mixing these ingredients with the fats.

3. The process of claim 1, wherein the 100 units of flour comprise from 30 to 50 units of roast corn flour and the corresponding complement of wheat flour.

4. The process of claim 3, wherein the 100 units of flour comprise about 30 units of roast corn flour and 70 units of wheat flour.

5. The process of claim 4, wherein the mixture comprises about 2.5 units of sugar, 2.5 units of skimmed milk, 2 units of fat, and one unit of salt.

6. The process of claim 1, wherein the milk is skimmed milk.

7. The process of claim 1, wherein the fats are vegetable oil.

8. The process of claim 1, wherein the product obtained is then toasted to render it friable and to colour it, then it is cooled.

9. The process of claim 1, wherein the mixture is shaped and baked in the form of a flat strip.

10. The process of claim 9, wherein said strip has a thickness of less than 10 mm.

11. The process of claim 9, wherein notches are then made in the thickness of the strip, the strip is then toasted to render it friable and to colour it, then it is cooled, and the strip is broken along the notches after toasting.

12. A process for making a food product as set forth in claim 1 wherein the step of shaping and baking is performed at a temperature between 140° and 155° C.

* * * * *